United States Patent [19]

Izumi

[11] Patent Number: 4,849,775

[45] Date of Patent: Jul. 18, 1989

[54] COLOR THERMAL PRINTER PRINTING SYSTEM

[75] Inventor: Masaki Izumi, Tokyo, Japan

[73] Assignee: Eastman Kodak Company, Rochester, N.Y.

[21] Appl. No.: 231,283

[22] Filed: Aug. 12, 1988

[30] Foreign Application Priority Data

Sep. 30, 1987 [JP] Japan ............................. 62-246369

[51] Int. Cl.$^4$ ............................................. G01U 15/00
[52] U.S. Cl. ...................................... 346/151; 346/154; 346/157; 346/106
[58] Field of Search .......... 346/151, 154, 157, 76 PH, 346/106; 358/80; 400/120, 240, 240.1; 219/216 PH

[56] References Cited

U.S. PATENT DOCUMENTS 4,399,749  8/1983  Arai ..................................... 346/157

Primary Examiner—Arthur G. Evans
Attorney, Agent, or Firm—Raymond L. Owens

[57] ABSTRACT

A color thermal printing system is disclosed which includes a color correcting unit having image data color correcting apparatus for each image data source and a dye film color correcting apparatus for dye films used in a thermal printer, such that the unit converts the corrected image data R, G and B into image data C, M and Y respectively.

1 Claim, 4 Drawing Sheets

COLOR THERMAL PRINTER PRINTING SYSTEM

BACKGROUND OF THE INVENTION

1. Field of the Invention

The present invention relates to a color thermal printing system having a color correcting unit for both the input data and the dye being used in the thermal printer.

2. Description of the Prior Art

In a color printing system of a thermal transfer recording system, the dye coated on an dye carrier film is sublimated into a recording paper by heat energy generated by exothermic resistors.

FIG. 1 is a block diagram showing an example of a control circuit in a conventional color printing thermal system of the thermal transfer recording type. In the diagram, reference numerals 1r, 1g, and 1b denote input terminals of digital image data of three colors which are R (red), G (green) and B (blue), respectively. These digital image data are written into corresponding data memories 2r, 2g and 2b under the control of a write control circuit (not shown), respectively. The data memories 2r, 2g and 2b have memory capabilities adapted to store image data for printing of one frame. Since the printing is performed on a line-by-line basis in one frame, the image data corresponding to each color includes print data relating to line. The print data on each line includes density gradation data representative of the dye density gradation or gray scale of each image pixel. The dye density of each pixel is caused by the heat produced by a particular on of n exothermic resistors (which will be explained later) at a position corresponding to each exothermic resistor.

Numeral 3 denotes a color correcting circuit for making print data on the three colors C (cyan), M (magenta) and Y (yellow) from the image data R, G and B respectively and for obtaining the gray balance or tone scale of the coloring matter in the film. The color correcting circuit includes three look-up tables 3c, 3m and 3y for color correction corresponding to the data memories 2r, 2g and 2b, respectively. As an example of the function of the look-up tables 3c, 3m and 3y, these tables make the transfer data on C, M and Y by obtaining the reciprocal numbers of the respective input data. For example, cyan dye will absorb red light and pass blue and green light. For a high dye density cyan pixel little or not reflected red light will be seen by an observer. For a low dye density cyan pixel, almost all of the red light well be seen by an observer. Thus, the cyan dye modulates red light. Similarly, the yellow dye modulates blue light and the magenta dye modulates green light.

Numeral 4 denotes a switching circuit having fixed contacts 4c, 4m and 4y which are respectively connected to the look-up tables 3c, 3m and 3y, and a movable contact 4o. The output from the switching circuit 4 is supplied to one input of a data comparator 5 and an output of a data counter 6 is supplied to the other input. The output of the data counter 6 is increased one by one each time a clock signal is received from a read control circuit 7 to control the readout of the print data from the data memories 2r, 2g and 2b and the switching of the contacts of the switching circuit 4.

An output signal DA of the data comparator 5 is stored in a shift register 9 in a thermal transfer print head TH under the control of a timing control circuit 8. The content of the shift register 9 is transferred to a latch circuit 10 when a latch signal LA is supplied from the timing control circuit 8. When gates 11 are opened by an enable signal EN from the timing control circuit 8, the signals from the latch circuit 10 are respectively applied to exothermic resistors 12.

The operation of the above mentioned prior system will now be described with reference to FIG. 1.

When a start signal is output from the timing control circuit 8, the read control circuit 7 performs control so that the movable contact 4o of the switching circuit is connected to the fixed contact 4c and also send an address signal to the data memory 2r, thereby allowing the first line print data to be read out. This print data is supplied to the data comparator 5 through the look-up table (LUT) 3c and the contact 4c and 4o. At the same time, the read control circuit 7 sends a clock signal to the data counter 6, thereby allowing "1" to be output therefrom and input to the data comparator 5. The data comparator 5 individually compares each density gradation data in the print data of the first line with "1" as the out put from the data counter 6. If the density gradation data is equal to or larger than "1", a signal representing "1" is output from the comparator 5. In the case of the density gradation data being lower than "1", a signal representing "o" is output. Namely, the data comparator 5 outputs "1" when the density gradation data is equal to or larger than "1", and outputs "0" in other cases. Based on the control performed by a clock signal CL from the timing control circuit 7, the output DA of the data comparator 5 is set in the shift register 9 is the thermal print head apparatus TH, which position corresponds to the order of the print data. The timing control circuit 8 subsequently sends the latch signal LA to the latch circuit 10, thereby allowing the data in the shift register 9 to be latched into the latch circuit 10. At this time, since the timing control circuit 8 has already applied an enable signal EN to the gates 11, only those exotermic resistors corresponding to the bits in which are holding "1" are selectively energized and generate heat.

Next, the read control circuit 7 again reads out the print data of the first line from the data memory 2r and controls the data counter 6 to output "2" in this case. When the density gradation data on the print data is equal to or larger than "2", the data comparator 5 outputs "1". On the other hand, when it is smaller than "2", the data comparator 5 outputs "0". These outputs are set into the bits of the shift register 9 respectively. The exothermic resistors corresponding to the bits which are set as "1" are driven in a manner similar to that mentioned above. The operations similar to those mentioned above are repeated hereinafter until the output from the data counter 6 is equal to the maximum value in the density gradation values. The printing of the first line if finished in this manner.

After completion of the transfer of the first line, the print data of the second and subsequent lines are sequentially read out of the data memory 2r in a similar manner and the printing of each line is thus performed. In this manner, the C-printing of one frame is finished. After completion of the C-printing, the read control circuit 7 controls the movable contact 4o of the switching circuit 4 to connect it to the fixed contact 4m. In a manner similar to the case of the C-printing, the M-printing of one frame by the print data of M is performed to transfer magenta dye (M) into the receiver which already received the cyan dye (C). Thereafter, the Y-printing (yellow) of one frame is executed by the print data of Y so as to transfer the yellow dye into the receiver. Thus, one color image is formed in a recording medium such as paper in the manner described above.

In the foregoing description, although the switching circuit 4 has merely been shown in the form of mechanical switch for the convenience of explanation, obviously electronic switches can also be used. In addition, although the look-up tables 3c, 3m and 3y are provided after the data memories 2r, 2g, and 2b in FIG. 1, this order may also be reversed. After the image data R, G and B have been color corrected by the look-up tables, they may be stored in the data memories. For a more detailed description of a thermal printer reference may be made to U.S. Pat. No. 4,710,783 to Caine et al.

In many cases, the conventional color printing system of a thermal transfer recording system receives data from a single image data source (e.g., TV camera to output image data of three colors R, G and B, or the like); therefore, no problem occur.

However, when there are a plurality of image data sources, for example, in a case where the source is selected from one of the TV signal from a television receiver, image signal from a TV camera, computer graphics data, image data from a document scanner and the like, and the signal of the selected source is supplied to a control circuit of a color printing system of a thermal transfer recording system, the color characteristics differ as between the respective image data sources. Moreover, in general, the color characteristics of dye carrier films or dye donors also differ according to the manufacturer. Therefore, in the conventional color printing systems of a thermal transfer recording system in which the color correcting circuit is effective only with respect to a single image data source, there is a problem in that it is difficult to perform accurate color correction when signals are supplied from a plurality of image data sources or when dye films of different manufacturers are used.

SUMMARY OF THE INVENTION

It is an object of the present invention to provide a color printing system which can use different dye films having different color characteristics in which even if signals are supplied from one of several optional image data sources, color images will have the correct color balance for each of the optional image data sources.

This object is achieved by a color thermal printing system including a control circuit having a color correcting unit for performing color correction upon image data supplied from a selected one of a plurality of different image data sources and a thermal printer arranged to transfer dye from a dye film into a recording medium on the basis of the color corrected image data from said color correcting unit, wherein said color correcting unit comprises image data correcting apparatus for image data sources which selectively receives the image data from one of the image data sources and which possesses a color correcting characteristic for converting the image data which is supplied from the selected image data source into corrected image data having a linear relationship with OD values of a gray scale chart; and dye film color correcting apparatus for said color correcting apparatus having a color correcting characteristic for converting the image data color corrected by the image data color correcting apparatus for the selected image data source into print data having a linear relationship with the OD values of the gray scale chart in accordance with the color characteristics of selected dye film.

By this means, even in a case where the image data are supplied from one of a number of optional image data sources or where dye films having different color characteristics are used, accurate color correction can be performed for the image data.

DESCRIPTION OF THE PREFERRED EMBODIMENTS

Figure 1:
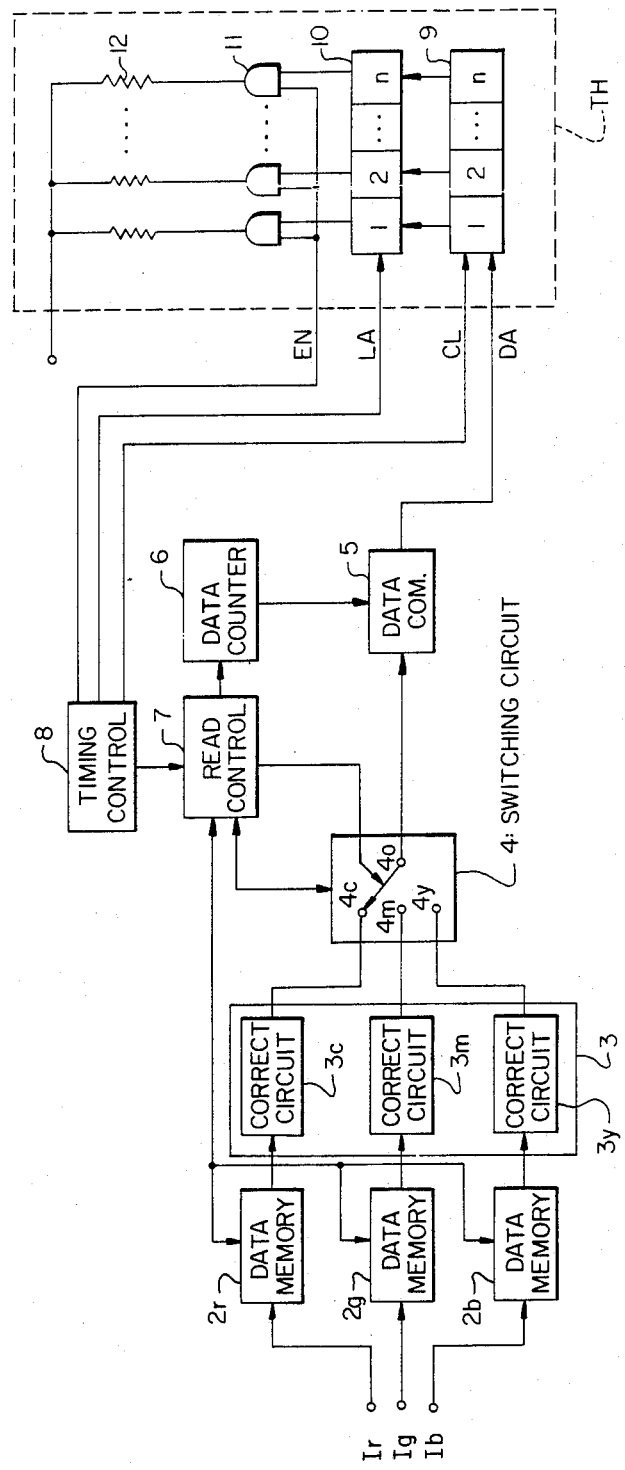
FIG. 1 is a block diagram of a conventional control circuit for use in a color thermal printing system.

An embodiment of the present invention will be described by referring to FIGS. 2 to 7. Those component elements which are similar to those depicted in FIG. 1 are designated by the same reference numerals.

Figure 2:
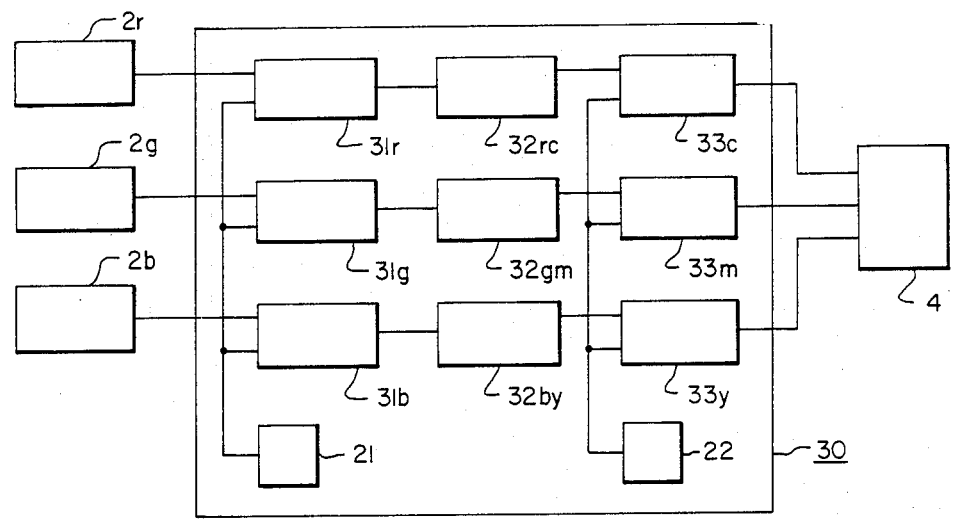
FIG. 2 is a block diagram showing an embodiment of a control circuit which can be employed in accordance with the present invention.

FIG. 2 is a block diagram showing an embodiment of the invention which features the provision of a color correcting unit 30 in place of the color correcting circuit 3, shown in FIG. 1.

The color correcting unit 30 comprises: color correcting apparatus 31r, 31g and 31b for image data source; data converting and density adjusting apparatus 32rc, 32gm, and 32by; and dye color correcting apparatus 33c, 33m and 33y for thermal printers. The respective characteristics of the color correcting apparatus 31r, 31g and 31b for the image data sources are changed by a first changing circuit 21. The respective characteristics of the color correcting apparatus 33c, 33m and 33y for the thermal printers are changes by a second changing circuit 22.

The color correcting apparatuses 31r, 31g and 31b for the image data sources which are respectively provided in correspondence with the outputs of the data memories 2r, 2g and 2b have correcting characteristics adapted to linearize the relationship of the respective three kinds of image data R, G and B with optical density values (OD values) obtained from a gray scale chart which densities correspond to the lightnesses from low density to high density. The data converting and density adjusting apparatus 32rc, 32gm and 32by convert the color corrected image data R, G and B supplied by the color correcting apparatus for the image data sources into three kinds of image data C, M and Y and adjust the density of the printed image according to the data source gain and dye film efficiency by a changing circuit (not shown). The color correcting apparatus 33c, 33m and 33y for the thermal printers have correcting characteristics for linearizing the image data C, M and Y with the OD values on the basis of the results obtained by printing the gray scales of different density levels from low to high using the three kinds of dye films C, M and Y.

The color correcting apparatus 31r, 31g and 31b for the image data sources, the data converting and density adjusting apparatus 32rc, 32gm and 32by, and the color correcting apparatus 33c, 33m and 33y for the printers are constituted by ROMs which store a plurality of look-up tables (hereinafter abbreviated to LUT) for color correction and data conversion. The procedure for creating the LUT which are stored in each ROM will be sequentially described by referring to FIGS. 3 to 5.

Figure 3:
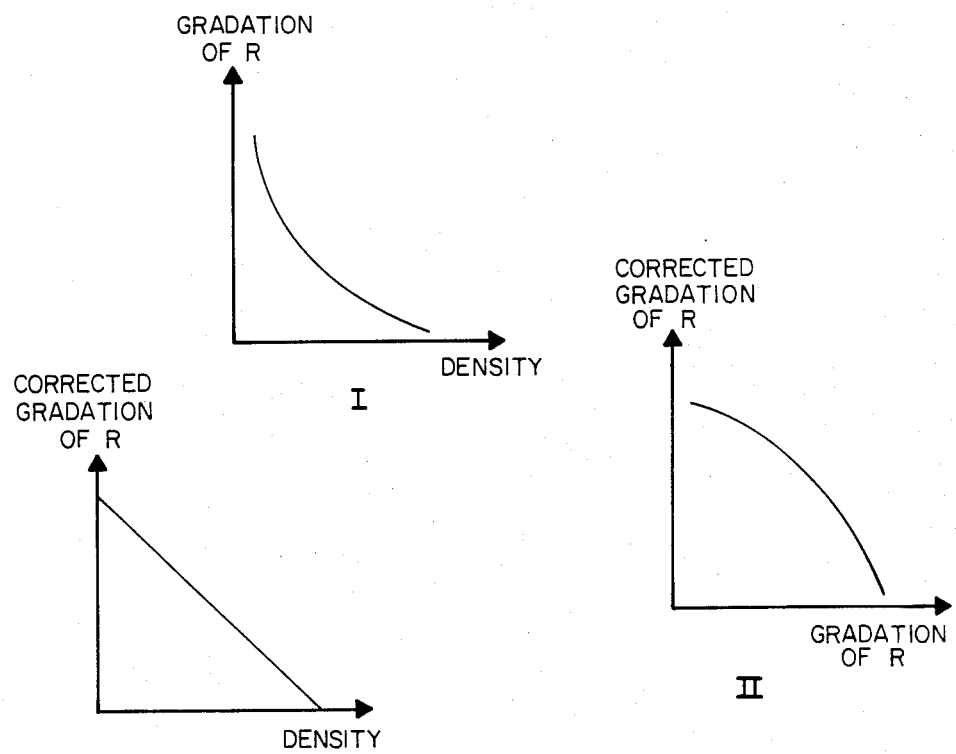
FIG. 3 shows graphical representations based on procedures for creating color correcting characteristics for image data sources.

FIG. 3 shows characteristic graphs (I), (II) and (III) to assist in explaining the procedures for creating the LUT for the color correcting apparatus 31r which is adapted to color correct the image data R. First, by use of a gray scale chart whose OD values is already known, the relationship between the gradations of the image data R extracted from the image data derived by photographing the original image using the relevant image data source (e.g., TV camera) and the OD values are duly obtained (I). Namely, the relation (I) between the OD values and the gradations of the original image is obtained as shown in FIG. 3. A correcting curve (II) for correcting the gradation obtained by the above procedure is derived (as shown in FIG. 3) in such a manner that the OD values and the corrected gradations have the linear relation (III) shown in FIG. 3 in a predetermined dynamic range. This correcting curve (II) is stored as LUT for the image data source in the ROM 31r.

Figure 4:
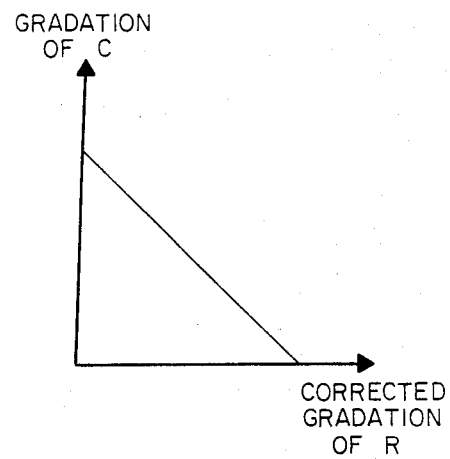
FIG. 4 shows a characteristic curve stored in a data converting and density adjusting apparatus of the type shown in FIG. 2.

FIG. 4 shows a characteristic curve stored in the data converting apparatus 32rc for converting and density adjusting the image data R corrected by the color correcting apparatus 31r into the image data C and changing the slope of the characteristic curve to adjust the density of the printed image. As shown in FIG. 3 (III) and FIG. 5 (III), both corrected gradations of image data R and C are linear to OD values. Therefore, by changing the slope of the characteristic curve, the density of the printed image can be adjusted without changing the color balance.

Figure 5:
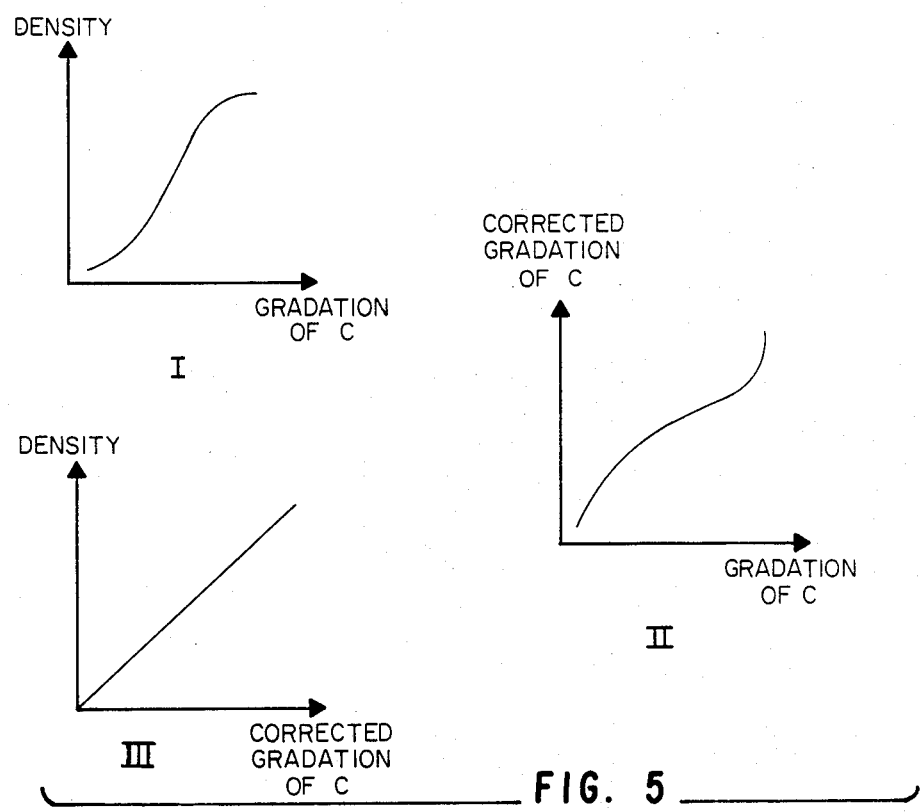
FIG. 5 shows graphical representations based on procedures for creating color correcting characteristics for dyes used in a printer.
Figure 6:
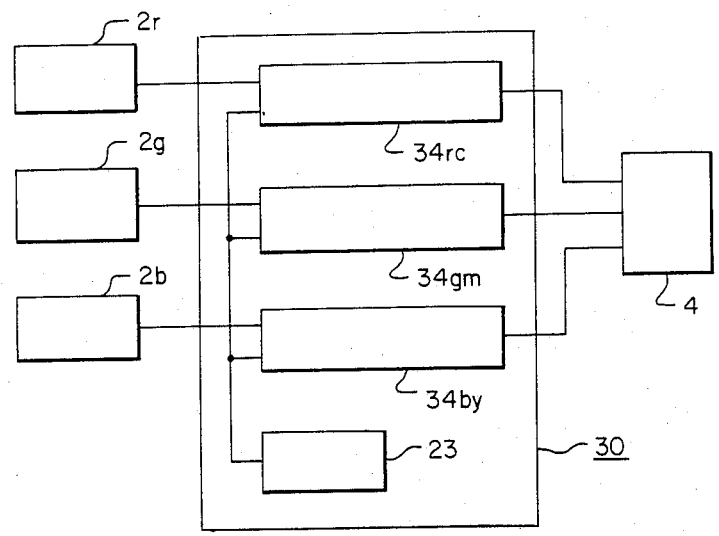
FIGS. 6 and 7 are block diagrams showing other preferred embodiments of control circuits for use in this invention.

FIG. 5 shows characteristic graphs (I) (II) and (III) to assist in explaining the procedures for creating LUT for the color correcting apparatus 33c for receiving the image data C from the data converting apparatus 32rc and outputting the print data in accordance with the color characteristic of the dye film. First the printing is performed by use of the image data C and the relation (I) between the gradations of the image data C and the OD values which are obtained from said gray scale chart is obtained as shown in FIG. 5. Next, a correcting curve (II) for correcting the gradation in the above procedure is obtained ( as shown in FIG. 5) in such a manner that the OD values and the corrected gradations of the image data C have the linear relation (III) shown in FIG. 5 in a predetermined dynamic range. This correcting curve (II) is stored as a LUT for the printer in the ROM 33C.

Procedures which are similar to those described above are also applied to the image data G and B or to the image data M and Y, whereby the other remaining color correcting apparatus or data converting and density adjusting apparatus including LUT can be obtained. Since the image data R, G an B obtained from said image data source can be corrected as image data having a linear relationship with the OD value, accurate color correction can be performed.

By repeating the foregoing procedures while changing the image data sources, LUT for the image data source and for the dye films used in the printer corresponding to the respective image data source are obtained and stored in the first color correcting apparatus for the image data source and the second color correcting apparatus for the printer, respectively. Depending on which image data source the image data R, G and B are supplied from, a combination of the LUT for the image data source and the LUT for the printer corresponding to that image data source is selected by the first and second changing circuits 21 and 22, and the characteristics of the color correcting apparatus for the image data source and of the color correcting apparatus of the printer are changed by selection. Moreover, the density of the printed image is changed according to the image data source gain and dye film efficiency. Thus, accurate color correction can be performed even if the image data source is changed.

The embodiment of FIG. 2 is constituted so that the color correcting apparatus for the image data source, the data converting and density adjusting apparatus, and the color correcting apparatus for the printer are provided for each of image data R, G and B, respectively. However, such color correcting and data conversion and density adjusting functions can be realized by the LUT stored in the ROMs, and it is thus possible to constitute an embodiment such that these functions are executed by a single ROM instead of using three ROMs for each of the image data R, G and B. This will be explained with reference to FIG. 6. In this second embodiment, the color correcting unit 30 has three color correcting apparatus 34rc, 34gm and 34by each of which is constituted a ROM. The first color correcting apparatus 34rc has all of the functions of the color correcting apparatus 31r for the image data source, the data converting and density adjusting apparatus 32rc and the color correcting apparatus 33c for the printer in FIG. 2. The second color correcting apparatus 34gm and the third color correcting apparatus 34by are similar to the first color correcting apparatus 34rc. A changing circuit 23 is connected to each of the color correcting apparatuses 34rc, 34gm and 34by. When the image data source or dye film is changed, the proper LUT stored in the first to third color correcting and density adjusting apparatus are selected and the characteristics of these color correcting and density adjusting apparatus are changed by selection.

Figure 7:
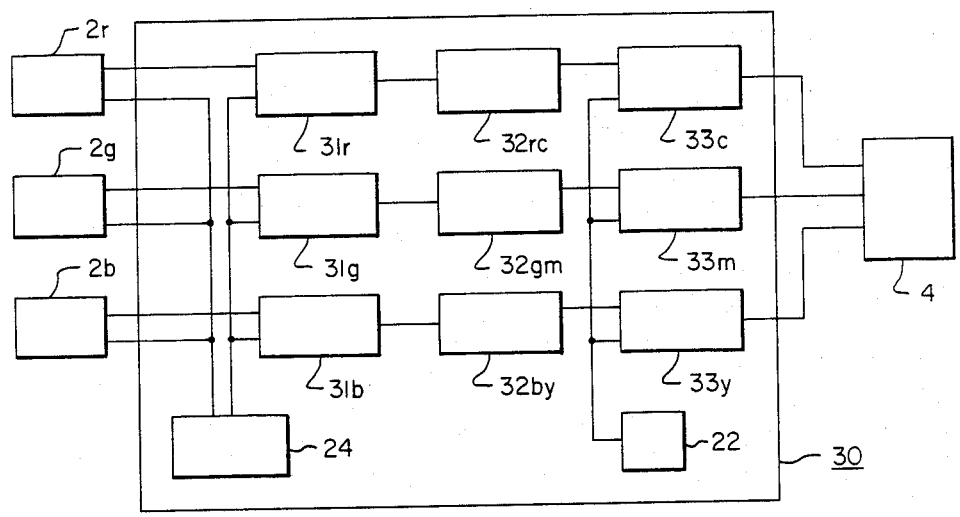

FIG. 7 shows the third embodiment of the invention. In this embodiment, a making circuit 24 of the LUT for the image data source is provided in place of the changing circuit 21 in FIG. 2. In addition to the functions which are similar to those of the changing circuit 21, the making circuit 24 also possess the functions of creating the LUT for the image data source and writing the LUT into the color correcting apparatus for the image data source. Namely, in the case of creating the LUT for the image data source, as already described with reference to FIG. 3, it is necessary to know the values of each of the gradations of the respective image data R, G and B for the given gray scale chart. In the third embodiment, the respective image data of R, G and B are supplied by the data memories 2r, 2g and 2b to the making circuit 24. Therefore, when the image data from a given image data source is supplied to the making circuit 24, the making circuit 24 creates the correcting curves (R, G and B0 corresponding to that image data source on the basis of this image data and writes the LUT for the image data source into the color correcting apparatus 31r, 31g and 31b for the image data sources.

In the third embodiment, the making circuit 24 accesses the data memories 2r, 2g and 2b and receives the image data. However, the LUT for the image data sources may also be created without accessing the data memories. Namely, the LUT for the image data sources which are such that the input and the output have the same data, are first stored in the color correcting apparatuses 31r, 31g and 31b for the image data sources, and in this state, the gray scale charts are printed. The OD values of the respective gray scales are measured with respect to the printed gray scale charts. On the basis of these OD values, the procedures for obtaining the LUT described above are reversely executed. In accordance with the order of (III) Y-axis → X-axis →(II) Y →X →(I) Y →X in FIG. 5 → FIG. 4 Y →X, the gradations of the image data R, G and B which need to be output from color correcting apparatuses 31r, 31g, 31b can be derived by the relevant calculations. Therefore, the LUT for the image data sources are calculated using the gradations obtained in this manner and loaded into the color correcting apparatus for the image data sources.

For example, the color correcting apparatus for the image data sources, the data converting and density adjusting apparatus and the color correcting apparatus for the printers are not limited to ROMs and other components having similar functions can be used in place of the ROMs described above.

The invention has been described in detail with particular reference to certain preferred embodiments thereof, but it will be understood that variations and modifications can be effected within the spirit and scope of the invention.

I claim:

1. In a color thermal printing system including a control circuit having a color correcting unit for performing color correction upon red, green and blue (R, G and B) image data supplied from a selected one of a plurality of different image data sources and a thermal printer arranged to selectively transfer cyan, magenta or yellow (C, M or Y) dye from a dye film into a recording medium on the basis of the color corrected image data from said color correcting unit, wherein said color correcting unit comprises:

image data color correcting apparatus for image data sources which selectively receives the image data from one of the image data sources and which possesses a color correcting characteristic for converting the image data which is supplied from the selected image data source into corrected image data having a linear relationship with OD values of a gray scale chart;

means for forming C, M and Y signals from the corrected R, G and B signals by respectively taking their inverse; and dye film color correcting apparatus for converting the C, M and Y signals for the respectively selected image data source into print data having a linear relationship with the OD values of the gray scale chart in accordance with the color characteristics of selected dye film.

* * * * *